United States Patent [19]

Martin

[11] 4,456,169
[45] Jun. 26, 1984

[54] ELECTRO-MECHANICAL STEADY STATE THERMOSTAT

[76] Inventor: Clifford M. Martin, General Delivery, Tarpon Springs, Fla. 33589

[21] Appl. No.: 483,593

[22] Filed: Apr. 11, 1983

[51] Int. Cl.$^3$ .................... G05D 15/00; G05D 23/12
[52] U.S. Cl. .............................. 236/78 D; 236/99 G; 236/101 E; 236/DIG. 1
[58] Field of Search .............. 236/48 A, 71, 72, 78 A, 236/78 D, 99 G, 101 E, DIG. 1; 337/54, 90, 134, 344; 335/151, 152, 154, 155, 177; 374/187, 188, 168, 195, 204

[56] References Cited

U.S. PATENT DOCUMENTS

| | | | |
|---|---|---|---|
| 2,439,711 | 4/1948 | Bovey | 236/78 D |
| 2,620,469 | 12/1952 | Estes | 236/78 D |
| 2,752,498 | 6/1956 | Ehret | 236/78 D |
| 3,405,870 | 10/1968 | De Forest | 236/78 D |
| 4,396,301 | 8/1983 | Stucki | 374/188 |

*Primary Examiner*—Harry Tanner
*Attorney, Agent, or Firm*—Stanley M. Miller

[57] ABSTRACT

A steady state thermostat is disclosed which employs a magnetic flux coupling technique to obtain a greater stability in its operation, resulting in a significant reduction in fuel costs. The thermostat includes a temperature sensor operated arm and a temperature setting arm pivotally mounted on a common base pivot. A first magnetic field source is mounted on the first end of the sensor arm coincident with a first axis and a second magnetic field source is mounted on the second end of the sensor arm coincident with a second axis. A first magnetic field sensor is mounted on the first end of the setting arm coincident with the first axis and adapted for proximate positioning with respect to the first magnetic field source when the selected orientation of the setting arm corresponds to the desired ambient temperature being higher in magnitude than the existing ambient temperature. The strength of the magnetic field which couples the magnetic sensor and the magnetic field source varies with the separation distance between them, allowing a gradual and continuous control signal to be generated by the magnetic sensor for controlling an ambient temperature increasing mechanism in a smooth and stable manner. Similarly, a second magnetic field sensor is mounted on the second end of the setting arm coincident with the second axis and adapted for proximate positioning with respect to the second magnetic field source when the selected orientation of the setting arm corresponds to the desired ambient temperature being lower than the existing ambient temperature.

23 Claims, 9 Drawing Figures

SEC. 2-2'

SEC. 7-7'

ELECTRO-MECHANICAL STEADY STATE THERMOSTAT

FIELD OF THE INVENTION

The invention disclosed broadly relates to control devices and more particularly relates to thermostatic controls.

BACKGROUND OF THE INVENTION

A thermostat is a closed loop feedback control device which has as its inputs a preset temperature value and a measured temperature which is to be controlled so as to approach in value the preset temperature. A thermostat can have its output connected to a fuel metering device in a heating plant, for example. In the typical thermostat, the difference between the measured temperature and the preset temperature is determined and a corrective signal is output to the heating plant which will have the effect of reducing that difference. For example, if the preset temperature is higher than the measured temperature, the thermostat will output a signal to the heating plant to increase the rate of fuel being supplied to the heating plant. The greater the difference between the preset temperature and the measured temperature, the stronger will be the signal sent by the thermostat to the heating plant to increase the rate of fuel being supplied. Once the heating plant has accomplished the desired increase in the measured temperature, the typical thermostat arives at a neutral zone state where no corrective signal is being sent to the heating plant. But the higher rate of fuel being supplied to the heating plant will result in the measured temperature increasing substantially above the preset temperature. This will cause the thermostat to pass through the neutral zone and enter into a state opposite to its previous state, wherein the measured temperature is greater than the preset temperature. The thermostat responds to this condition by outputting a signal to the heating plant to reduce the rate of fuel being supplied so that the measured temperature will decrease toward the preset temperature. The excessive cycling of the measured temperature about the value of the preset temperature is an undesireable feature of prior art thermostats, because overcoming the thermal inertia of the building or boiler whose temperature is to be controlled, by cyclic overheating and underheating, is very wasteful of fuel and thermally stresses the heating plant. There are other drawbacks to prior art thermostats, such as the use of mercury-wetted switches which requires that the thermostat can only be mounted in one position and which also poses the risk of explosion when used in flammable environments. Typical prior art thermostats are bulky devices which can be obtrusively unesthetic in home or office use.

OBJECTS OF THE INVENTION

It is therefor an object of the invention to provide an improved thermostat which minimizes thermal cycling.

It is a further object of the invention to provide an improved thermostat which will reduce fuel costs by reducing thermal cycling.

It is still another object of the invention to provide an improved thermostat which will reduce the thermal stresses on a heating plant by reducing thermal cycling.

It is yet another object of the invention to provide an improved thermostat which is explosion proof in a flammable environment.

It is still a further object of the invention to provide an improved thermostat which is capable of installation in a variety of orientations.

It is another object of the invention to provide an improved thermostat which is compact in design.

SUMMARY OF THE INVENTION

These and other objects, features and advantages of the invention are accomplished by the steady state thermostat disclosed herein. The steady state thermostat includes a temperature sensor operated arm pivotally mounted on a base pivot, operatively connected to a thermo-mechanical transducer, and having first and second ends, for undergoing pivotal motion with respect to the base pivot in response to the thermo-mechanical transducer sensing a change in the existing ambient temperature. The thermostat further includes a temperature setting arm pivotally mounted on the base pivot and having first and second ends, for receiving a selected orientation setting corresponding to a desired ambient temperature to be achieved. The thermostat further includes a first magnetic field source mounted on the first end of the sensor arm coincident with a first axis and a second magnetic field source mounted on the second end of the sensor arm coincident with a second axis. The thermostat still further includes a first magnetic field sensor mounted on the first end of the setting arm coincident with the first axis and adapted for proximate positioning with respect to the first magnetic field source when the selected orientation of the setting arm corresponds to the desired ambient temperature being higher in magnitude than the existing ambient temperature. The thermostat also includes a second magnetic field sensor mounted on the second end of the setting arm coincident with the second axis and adapted for proximate positioning with respect to the second magnetic field source when the selected orientation of the setting arm corresponds to the desired ambient temperature being lower than the existing ambient temperature. The first magnetic field sensor is operatively connected to a first means for increasing the existing ambient temperature and the second magnetic field sensor is operatively connected to a second means for decreasing the existing ambient temperature. The first means operatively increases the existing ambient temperature in response to the proximate positioning of the first magnetic field sensor with respect to the first magnetic field source. The second means operatively decreases the existing ambient temperature in response to the proximate positioning of the second magnetic field sensor with respect to the second magnetic field source. In this manner, steady state control of the ambient temperature is achieved.

DESCRIPTION OF THE FIGURES

These and other object, features and advantages of the invention will be more fully appreciated with reference to the accompanying figures.

DISCUSSION OF THE PREFERRED EMBODIMENT

Figure 1:
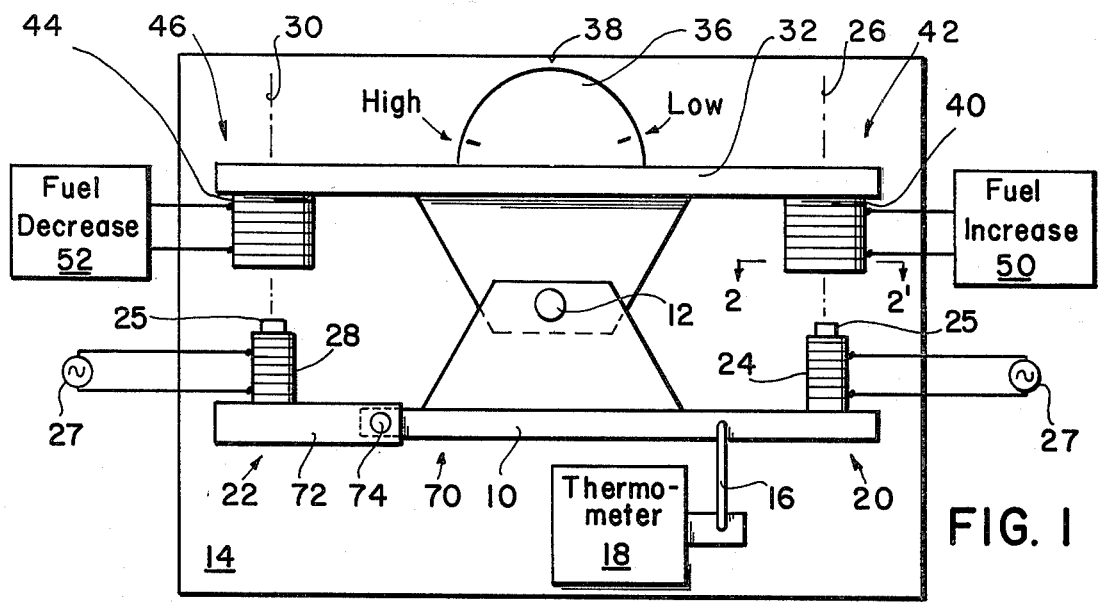
FIG. 1 is an overall front view of the preferred embodiment of the invention.
Figure 4:
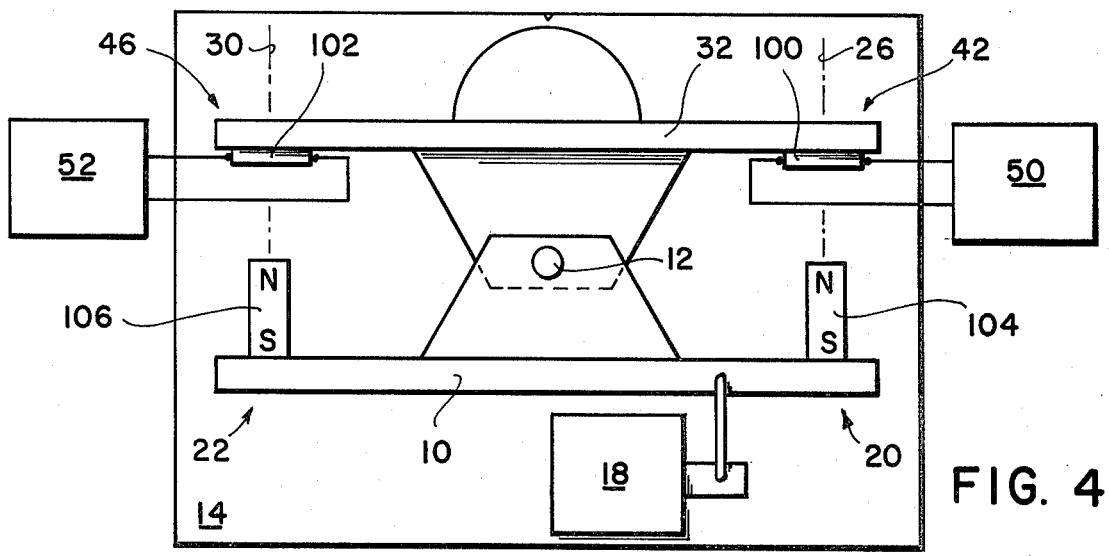
FIG. 4 is a front view of the second embodiment of the invention which features Hall-effect sensors and permanent magnets as the source of the magnetic flux being sensed.
Figure 8:
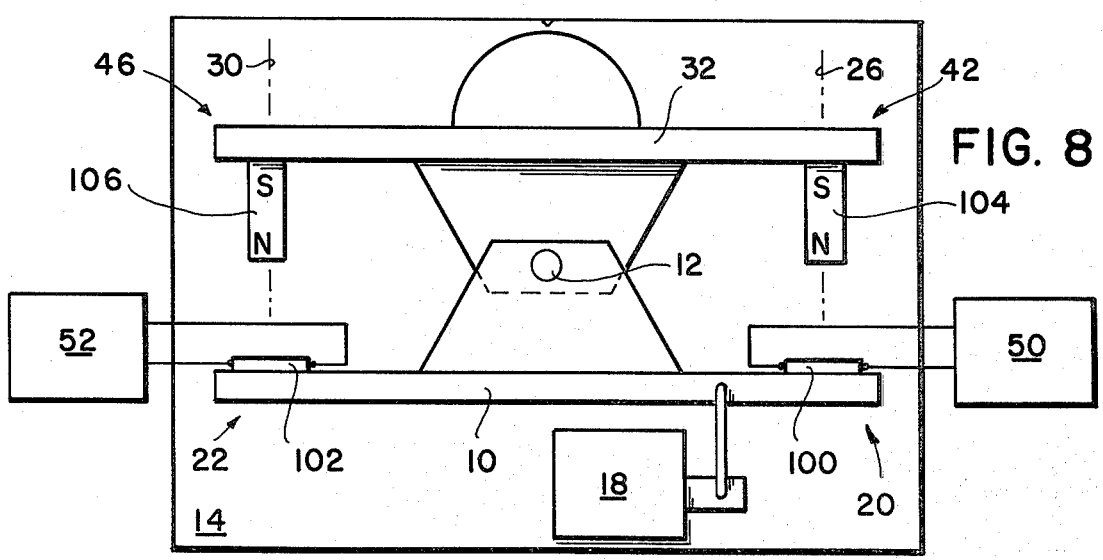
FIG. 8 is a frontal view of a fifth embodiment of the invention, wherein the magnetic sensors are mounted on the temperature sensor operated arm 10 and the magnetic sources are mounted on the setting arm 32.
Figure 2:
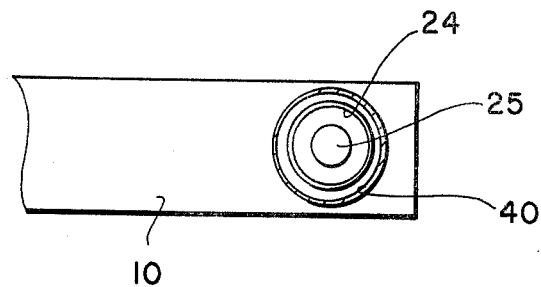
FIG. 2 is a top cross sectional view along the section line 2-2' of FIG. 1.
Figure 3A:
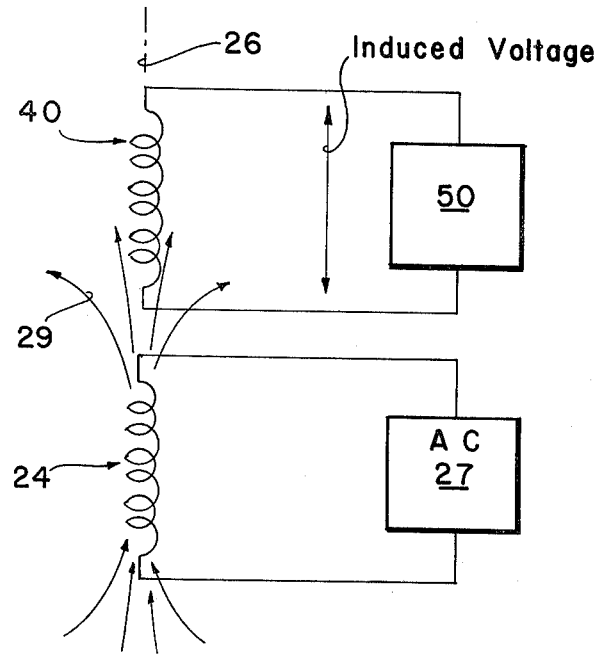
FIG. 3a is an electrical schematic diagram of the preferred embodiment of the invention, showing how the magnetic flux from the primary coil 24 links with the secondary sensor coil 40.
Figure 3B:
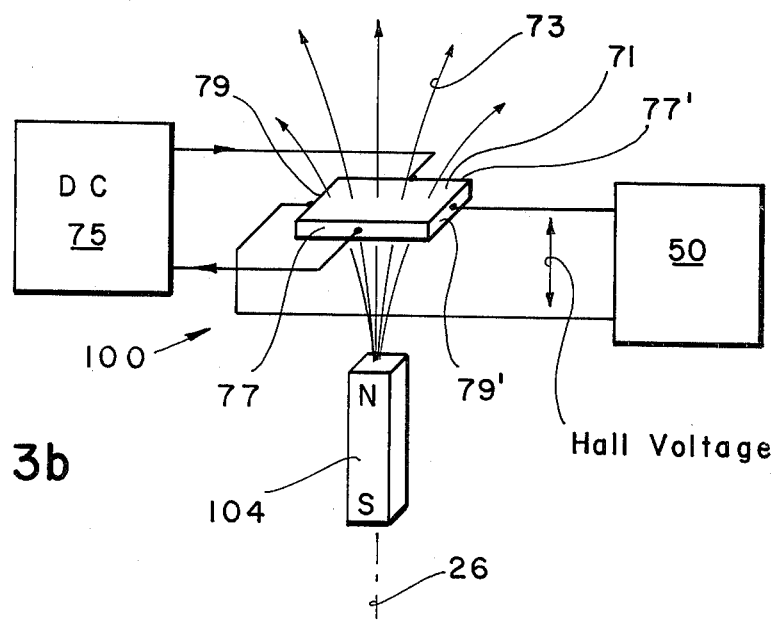
FIG. 3b is an electrical schematic diagram of a second embodiment of the invention, showing how the magnetic flux from the permanent magnet 104 links with the Hall-effect device 100.
Figure 5:
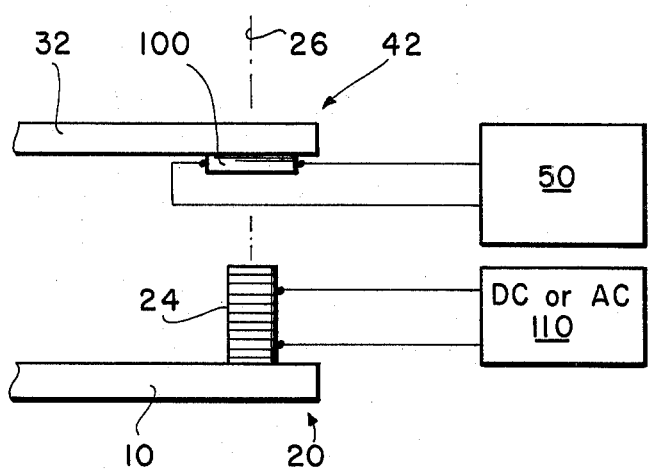
FIG. 5 is a partial front view of a third embodiment of the invention which employs Hall-effect sensors and a coil 24 as the source of the magnetic flux being sensed.
Figure 6:
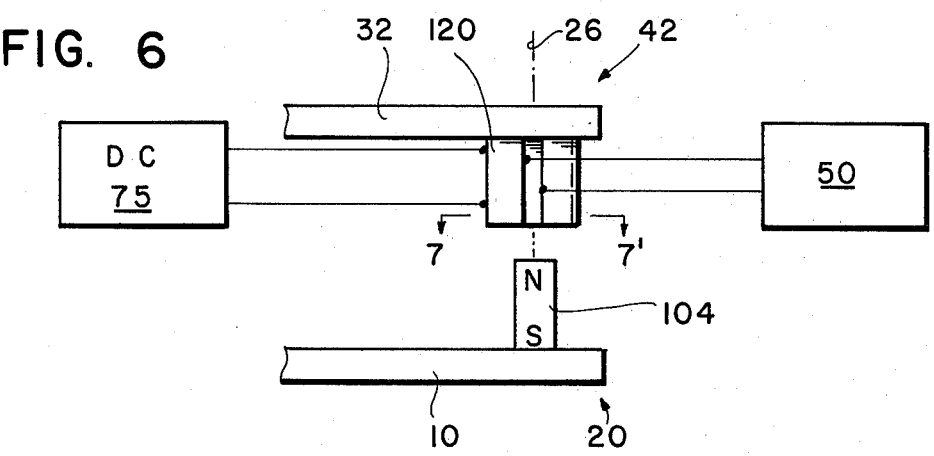
FIG. 6 is a partial front view of a fourth embodiment of the invention wherein a Hall-effect device having a hollow, cylindrical symmetry is employed as the sensor, providing a greater magnetic flux measurement sensitivity while making the assembly more compact.
Figure 7:
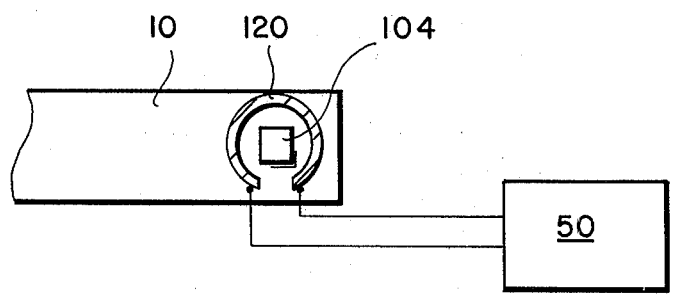
FIG. 7 is a top cross sectional view along the section line 7-7' of FIG. 6.

Five embodiments of the invention are disclosed. The preferred embodiment is shown in FIGS. 1, 2 and 3a. The second embodiment of the invention is shown in FIGS. 3b and 4. The third embodiment of the invention is shown in FIG. 5. The fourth embodiment of the invention is shown in FIGS. 6 and 7. And the fifth embodiment of the invention is shown in FIG. 8.

In the preferred embodiment of the invention of FIGS. 1, 2 and 3a, the steady state thermostat employs a magnetic flux coupling technique to obtain a greater stability in its operation, resulting in a significant reduction in fuel costs. The thermostat includes a temperature sensor operated arm 10 and a temperature setting arm 32 pivotally mounted on a comron base pivot 12. A first magnetic field source 24 is mounted on the first end 20 of the sensor arm 10 coincident with a first axis 26 and a second magnetic field source 28 is mounted on the second end 22 of the sensor arm 10 coincident with a second axis 30. A first magnetic field sensor 40 is mounted on the first end 42 of the setting arm 32 coincident with the first axis 26 and adapted for proximate positioning with respect to the first magnetic field source 24 when the selected orientation of the setting arm 32 corresponds to the desired ambient temperature being higher in magnitude than the existing ambient temperature. The strength of the magnetic field 29 shown in FIG. 3a, which couples the magnetic sensor 40 and the magnetic field source 24 varies approximately as the inverse third power of the separation distance between them.

This allows a gradual and continuous control signal to be generated by the magnetic sensor 40 for controlling an ambient temperature increasing mechanism 50 in a smooth and stable manner. Similarly, a second magnetic field sensor 44 is mounted on the second end 46 of the setting arm 32 coincident with the second axis 30 and adapted for proximate positioning with respect to the second magnetic field source 28 when the selected orientation of the setting arm 32 corresponds to the desired ambient temperature being lower than the existing ambient temperature.

In greater detail, the steady state thermostat of FIG. 1 includes a temperature sensor operated arm 10 pivotally mounted on a base pivot 12 of the base 14, operatively connected by the rod 16 to a thermometer 18 with a mechanical output, such as a bimetallic strip. The arm 10 has first and second ends 20 and 22, for undergoing pivotal motion with respect to the base pivot 12 in response to the thermometer 18 sensing a change in the existing ambient temperature. The thermostat further includes a temperature setting arm 32 pivotally mounted on the base pivot 12 and having first and second ends 42 and 46, for receiving a selected manual orientation setting with the dial 36 and the indicator 38, corresponding to a desired ambient temperature to be achieved. The thermostat further includes a first magnetic field source 24 mounted on the first end 20 of the sensor arm 10 coincident with a first axis 26 and a second magnetic field source 28 mounted on the second end 22 of the sensor arm 10 coincident with a second axis 30. The thermostat still further includes a first magnetic field sensor 40 mounted on the first end 42 of the setting arm 32 coincident with the first axis 26 and adapted for proximate positioning with respect to the first magnetic field source 24 when the selected orientation of the setting arm 32 corresponds to the desired ambient temperature being higher in magnitude than the existing ambient temperature. The thermostat also includes a second magnetic field sensor 44 mounted on the second end 46 of the setting arm 32 coincident with the second axis 30 and adapted for proximate positioning with respect to the second magnetic field source 28 when the selected orientation of the setting arm 32 corresponds to the desired ambient temperature being lower than the existing ambient temperature. The first magnetic field sensor 40 is operatively connected to a first mechanism 50 for increasing the existing ambient temperature and the second magnetic field sensor 44 is operatively connected to a second mechanism 52 for decreasing the existing ambient temperature. The first mechanism 50 operatively increases the existing ambient temperature in response to the proximate positioning of the first magnetic field sensor 40 with respect to the first magnetic field source 24. The second mechanism 52 operatively decreases the existing ambient temperature in response to the proximate positioning of the second magnetic field sensor 44 with respect to the second magnetic field source 28. In this manner, steady state control of the ambient temperature is achieved.

FIG. 1 shows that the first magnetic field source 24 is a first primary coil driven by alternating current, mounted on the first end of the sensor arm coincident with the first axis and that the second magnetic field source 28 is a second primary coil which can be driven by the same source 27 of alternating current, mounted on the second end of the sensor arm coincident with the second axis.

The first and second primary coils 24 and 28, which have an alternating current input thereto, generate a first magnetic flux about the first primary coil 24 coincident with the first axis 26 and a second magnetic flux about the second primary coil 28 coincident with the second axis 30. The magnetic flux can be concentrated and directed by a suitable ferromagnetic core 25 within the coils 24 and 28.

FIG. 1 shows the first magnetic field sensor 40 being a first secondary coil mounted on the first end 42 of the setting arm 32 coincident with the first axis 26 and adapted for proximate positioning with respect to the first magnetic field source coil 24 when the selected orientation of the setting arm 32 corresponds to the desired ambient temperature being higher in magnitude than the existing ambient temperature.

FIG. 1 also shows the second magnetic field sensor 44 being a second secondary coil mounted on the second end 46 of the setting arm 32 coincident with the second axis 30 and adapted for proximate positioning with respect to the second magnetic field source coil 28 when the selected orientation of the setting arm 32 corresponds to the desired ambient temperature being lower than the existing ambient temperature.

The first mechanism 50 for increasing the existing ambient temperature can be a fuel supply increasing mechanism in a heating plant such as a furnace and the second mechanism 52 for decreasing the existing ambient temperature can be a fuel supply decreasing mechanism in the heating plant. An example of a burner to mate with the thermostat invention would be an efficient, multi-rate (variable input rate) single-port inshot type with a pilot light flame directed into the port for positive ignition when fuel is servo-advanced from a previously closed valve. The servo which opens and closes the fuel valve could also control the blower through relays in the valve limit switch circuit. Alternately, since there will be minimal cycling of the system, the blower could always remain on, thereby eliminating the stresses on the blower motor from cyclically starting up.

Alternately, the first mechanism 50 for increasing the existing ambient temperature can be a coolant supply decreasing mechanism in a cooling plant such as a refrigeration system and the second mechanism 52 for decreasing the existing ambient temperature being a coolant supply increasing mechanism in the cooling plant.

The ambient temperature being controlled can be the temperature inside a building or alternately the temperature inside a boiler.

FIG. 1 shows that the temperature sensor operated arm 10 can further have the second end 22 thereof having an inner portion 70 integral with the first end 20 thereof and an outer portion 72 pivotally mounted at 74 to the inner portion 70 thereof, for adjusting the separation distance of the first and second magnetic sources 24 and 28 with respect to the respective first and second magnetic sensors 40 and 44.

In this manner, the magnitude of a neutral zone of operation can be adjusted.

A second embodiment of the invention is shown in FIGS. 3b and 4, which employs a Hall-effect device as the magnetic field sensor. The Hall-effect device 100 shown in FIG. 3b, is composed of a semiconductor material such as silicon, shaped into a plate having two major surfaces 71, and four minor side surfaces 77, 77', 79 and 79'. When an electric current is applied by the direct current source 75 between the opposed side surfaces 77 and 77', and a magnetic flux passes through the major surface 71, then a voltage called the Hall voltage appears between the other two opposed side surfaces 79 and 79'. The magnitude of this Hall voltage is proportional to the strength of the magnetic flux passing through the surface 71. Since the strength of the magnetic flux produced by the permanent magnet 104 is increased as the magnet approaches the Hall-effect device 100, the amplitude of the Hall voltage output by the device 100 is a good measure of the proximity of the magnet 104 thereto.

As is shown in FIG. 4, the first magnetic field sensor 40 can be the first Hall-effect device 100 mounted on the first end 42 of the setting arm 32 coincident with the first axis 26 and adapted for proximate positioning with respect to the first magnetic field source 24 when the selected orientation of the setting arm 32 corresponds to the desired ambient temperature being higher in magnitude than the existing ambient temperature.

As is shown in FIG. 5, the first magnetic field source 24 can be a first primary coil mounted on the first end 20 of the sensor arm 10 coincident with the first axis 26.

Alternately, as shown in FIG. 4, the first magnetic field source 40 can be a first permanent magnet 104 mounted on the first end 20 of the sensor arm 10 coincident with the first axis 26.

Alternately, as shown in FIGS. 6 and 7, the first Hall-effect device 120 can have a hollow cylindrical shape with an axis coincident with the first axis 26, adapted to at least partially envelop the first magnetic field source 24 such as the permanent magnet 104 when in the close proximity thereto. The direct current source 75 can apply the electric current vertically through the device 120 of FIG. 6 and the Hall voltage can be output from the opposed surfaces of the device and input to the mechanism 50 as is shown in FIG. 7.

FIG. 4 also shows the second magnetic field sensor 44 can be a second Hall-effect device 102 mounted on the second end 46 of the setting arm 32 coincident with the second axis 30 and adapted for proximate positioning with respect to the second magnetic field source 28 when the selected orientation of the setting arm 32 corresponds to the desired ambient temperature being lower than the existing ambient temperature.

The second magnetic field source 28 can be a second primary coil mounted on the second end 22 of the sensor arm 10 coincident with the second axis 30.

Alternately, as shown in FIG. 4, the second magnetic field source 28 can be a second permanent magnet 106 mounted on the second end 22 of the sensor arm 10 coincident with the second axis 30.

Alternately, the second Hall-effect device can be a hollow cylindrical shape similar to that shown in FIGS. 6 and 7, with an axis coincident with the second axis, adapted to at least partially envelop the second magnetic field source when in the close proximity thereto.

In the fifth embodiment of the invention shown in FIG. 8, the first magnetic field source can be mounted on the first end of the setting arm coincident with a first axis and a second magnetic field source mounted on the second end of the setting arm coincident with a second axis. The first magnetic field sensor can be mounted on the first end of the sensor arm coincident with the first axis and adapted for proximate positioning with respect to the first magnetic field source when the selected orientation of the setting arm corresponds to the desired ambient temperature being higher in magnitude than the existing ambient temperature. The second magnetic field sensor can be mounted on the second end of the sensor arm coincident with the second axis and adapted for proximate positioning with respect to the second magnetic field source when the selected orientation of the setting arm corresponds to the desired ambient temperature being lower than the existing ambient temperature.

As shown in FIG. 8, the first magnetic field sensor can be the first Hall-effect device 100 mounted on the first end of the sensor arm coincident with the first axis and adapted for proximate positioning with respect to the first magnetic field source when the selected orientation of the setting arm corresponds to the desired ambient temperature being higher in magnitude than the existing ambient temperature. The first magnetic field source can be the a first permanent magnet 104 mounted on the first end of the setting arm coincident with the first axis. The second magnetic field sensor can be the a second Hall-effect device 102 mounted on the second end of the sensor arm coincident with the second axis and adapted for proximate positioning with respect to the second magnetic field source when the selected orientation of the setting arm corresponds to the desired ambient temperature being lower than the existing ambient temperature. The second magnetic field source can be the second permanent magnet 106 mounted on the second end of the setting arm coincident with the second axis.

It should be appreciated that in either the second embodiment of FIG. 4, the third embodiment of FIG. 5, or the fifth embodiment of FIG. 8, the Hall-element 100 or 102 can also be oriented vertically as well as in the existing horizontal direction. Referring to FIG. 3b, a vertical orientation would place surfaces 77 and 77' perpendicular to the axis 26 or an alternate vertical orientation would place surfaces 79 and 79' perpendicular to the axis 26. Such a vertical orientation for the device 100 or 102 may have advantages in some applications of the invention.

The resultant invention provides an improved thermostat which minimizes thermal cycling and thereby will reduce fuel costs and will reduce the thermal stresses on a heating plant. The improved thermostat is explosion proof in a flammable environment. And the improved thermostat is capable of installation in a variety of orientations and is compact in design.

Although specific embodiments of the invention have been disclosed, it should be understood by those having skill in the art that minor changes can be made to the structure and materials which have been disclosed without departing from the spirit and the scope of the invention.

What is claimed is:

1. A steady state thermostat, comprising:
    a temperature sensor operated arm pivotally mounted on a base pivot, operatively connected to a thermomechanical transducer, and having first and second ends, for undergoing pivotal motion with respect to said base pivot in response to said thermomechanical transducer sensing a change in the existing ambient temperature;
    a temperature setting arm pivotally mounted on said base pivot and having first and second ends, for receiving a selected orientation setting corresponding to a desired ambient temperature to be achieved;
    a first magnetic field source mounted on said first end of said sensor arm coincident with a first axis and a second magnetic field source mounted on said second end of said sensor arm coincident with a second axis;
    a first magnetic field sensor mounted on said first end of said setting arm coincident with said first axis and adapted for proximate positioning with respect to said first magnetic field source when said selected orientation of said setting arm corresponds to said desired ambient temperature being higher in magnitude than said existing ambient temperature;
    a second magnetic field sensor mounted on said second end of said setting arm coincident with said second axis and adapted for proximate positioning with respect to said second magnetic field source when said selected orientation of said setting arm corresponds to said desired ambient temperature being lower than said existing ambient temperature;
    said first magnetic field sensor being operatively connected to a first means for increasing said existing ambient temperature and said second magnetic field sensor being operatively connected to a second means for decreasing said existing ambient temperature;
    said first means operatively increasing said existing ambient temperature in response to said proximate positioning of said first magnetic field sensor with respect to said first magnetic field source;
    said second means operatively decreasing said existing ambient temperature in response to said proximate positioning of said second magnetic field sensor with respect to said second magnetic field source;
    whereby steady state control of said ambient temperature is achieved.

2. The apparatus of claim 1, which further comprises:
    said first magnetic field source being a first primary coil mounted on said first end of said sensor arm coincident with said first axis and said second magnetic field source being a second primary coil mounted on said second end of said sensor arm coincident with said second axis.

3. The apparatus of claim 2, wherein said first and second primary coils have an alternating current input thereto, generating a first magnetic flux about said first primary coil coincident with said first axis and a second magnetic flux about said second primary coil coincident with said second axis.

4. The apparatus of claim 3, which further comprises:
    said first magnetic field sensor being a first secondary coil mounted on said first end of said setting arm coincident with said first axis and adapted for proximate poisitioning with respect to said first magnetic field source when said selected orientation of said setting arm corresponds to said desired ambient temperature being higher in magnitude than said existing ambient temperature.

5. The apparatus of claim 3, which further comprises:
    said second magnetic field sensor being a second secondary coil mounted on said second end of said setting arm coincident with said second axis and adapted for proximate positioning with respect to said second magnetic field source when said selected orientation of said setting arm corresponds to said desired ambient temperature being lower than said existing ambient temperature.

6. The apparatus of claim 1, which further comprises:
    said first means for increasing said existing ambient temperature being a fuel supply increasing mechanism in a heating plant and said second means for decreasing said existing ambient temperature being a fuel supply decreasing mechanism in said heating plant.

7. The apparatus of claim 1, which further comprises:
    said first means for increasing said existing ambient temperature being a coolant supply decreasing mechanism in a cooling plant and said a second means for decreasing said existing ambient temperature being a coolant supply increasing mechanism in said cooling plant.

8. The apparatus of claim 1, wherein said ambient temperature is the temperature inside a building.

9. The apparatus of claim 1, wherein said ambient temperature is the temperature inside a boiler.

10. The apparatus of claim 1, wherein said temperature sensor operated arm further comprises:
said second end thereof having an inner portion integral with said first end thereof and an outer portion pivotally mounted to said inner portion thereof, for adjusting the separation distance of said first and second magnetic sources with respect to said respective first and second magnetic sensors;
whereby the magnitude of a neutral zone of operation can be adjusted.

11. The apparatus of claim 1, which further comprises:
said first magnetic field sensor being a first Hall-effect device mounted on said first end of said setting arm coincident with said first axis and adapted for proximate positioning with respect to said first magnetic field source when said selected orientation of said setting arm corresponds to said desired ambient temperature being higher in magnitude than said existing ambient temperature.

12. The apparatus of claim 11, which further comprises:
said first magnetic field source being a first primary coil mounted on said first end of said sensor arm coincident with said first axis.

13. The apparatus of claim 11, which further comprises:
said first magnetic field source being a first permanent magnet mounted on said first end of said sensor arm coincident with said first axis.

14. The apparatus of claim 11, wherein said first Hall-effect device has a hollow cylindrical shape with an axis coincident with said first axis, adapted to at least partially envelop said first magnetic field source when in said close proximity thereto.

15. The apparatus of claim 1, which further comprises:
said second magnetic field sensor being a second Hall-effect device mounted on said second end of said setting arm coincident with said second axis and adapted for proximate positioning with respect to said second magnetic field source when said selected orientation of said setting arm corresponds to said desired ambient temperature being lower than said existing ambient temperature.

16. The apparatus of claim 15, which further comprises:
said second magnetic field source being a second primary coil mounted on said second end of said sensor arm coincident with said second axis.

17. The apparatus of claim 15, which further comprises:
said second magnetic field source being a second permanent magnet mounted on said second end of said sensor arm coincident with said second axis.

18. The apparatus of claim 15, wherein said second Hall-effect device has a hollow cylindrical shape with an axis coincident with said second axis, adapted to at least partially envelop said second magnetic field source when in said close proximity thereto.

19. A steady state thermostat, comprising:
a temperature sensor operated arm pivotally mounted on a base pivot, operatively connected to a thermomechanical transducer, and having first and second ends, for undergoing pivotal motion with respect to said base pivot in response to said thermomechanical transducer sensing a change in the existing ambient temperature;
a temperature setting arm pivotally mounted on said base pivot and having first and second ends, for receiving a selected orientation setting corresponding to a desired ambient temperature to be achieved;
a first magnetic field source mounted on said first end of said setting arm coincident with a first axis and a second magnetic field source mounted on said second end of said setting arm coincident with a second axis;
a first magnetic field sensor mounted on said first end of said sensor arm coincident with said first axis and adapted for proximate positioning with respect to said first magnetic field source when said selected orientation of said setting arm corresponds to said desired ambient temperature being higher in magnitude than said existing ambient temperature;
a second magnetic field sensor mounted on said second end of said sensor arm coincident with said second axis and adapted for proximate positioning with respect to said second magnetic field source when said selected orientation of said setting arm corresponds to said desired ambient temperature being lower than said existing ambient temperature;
said first magnetic field sensor being operatively connected to a first means for increasing said existing ambient temperature and said second magnetic field sensor being operatively connected to a second means for decreasing said existing ambient temperature;
said first means operatively increasing said existing ambient temperature in response to said proximate positioning of said first magnetic field sensor with respect to said first magnetic field source;
said second means operatively decreasing said existing ambient temperature in response to said proximate positioning of said second magnetic field sensor with respect to said second magnetic field source;
whereby steady state control of said ambient temperature is achieved.

20. The apparatus of claim 19, which further comprises:
said first magnetic field sensor being a first Hall-effect device mounted on said first end of said sensor arm coincident with said first axis and adapted for proximate positioning with respect to said first magnetic field source when said selected orientation of said setting arm corresponds to said desired ambient temperature being higher in magnitude than said existing ambient temperature.

21. The apparatus of claim 20, which further comprises:
said first magnetic field source being a first permanent magnet mounted on said first end of said setting arm coincident with said first axis.

22. The apparatus of claim 19, which further comprises:
said second magnetic field sensor being a second Hall-effect device mounted on said second end of said sensor arm coincident with said second axis and adapted for proximate positioning with respect to said second magnetic field source when said selected orientation of said setting arm corresponds to said desired ambient temperature being lower than said existing ambient temperature.

23. The apparatus of claim 22, which further comprises:
said second magnetic field source being a second permanent magnet mounted on said second end of said setting arm coincident with said second axis.

* * * * *